US 6,783,432 B2

United States Patent
Li et al.

(10) Patent No.: US 6,783,432 B2
(45) Date of Patent: Aug. 31, 2004

(54) ADDITIVES FOR PRESSURE SENSITIVE POLISHING COMPOSITIONS

(75) Inventors: Jui-Lung Li, San Jose, CA (US); Yuchun Wang, San Jose, CA (US); Rajeev Bajaj, Fremont, CA (US); Fred C. Redeker, Fremont, CA (US)

(73) Assignee: Applied Materials Inc., Santa Clara, CA (US)

( * ) Notice: Subject to any disclaimer, the term of this patent is extended or adjusted under 35 U.S.C. 154(b) by 231 days.

(21) Appl. No.: 09/874,177

(22) Filed: Jun. 4, 2001

(65) Prior Publication Data

US 2002/0182982 A1 Dec. 5, 2002

(51) Int. Cl.[7] .................................................. B24B 1/00

(52) U.S. Cl. ............................ 451/36; 451/41; 451/63; 51/307

(58) Field of Search ........................ 51/307, 308, 309; 216/88, 89, 90; 438/690, 691, 692, 693; 451/36, 41, 54, 59, 60, 63

(56) References Cited

U.S. PATENT DOCUMENTS

| | | | |
|---|---|---|---|
| 4,789,648 A | 12/1988 | Chow et al. ................ | 437/225 |
| 5,209,816 A | 5/1993 | Yu et al. ..................... | 156/636 |
| 5,340,370 A | 8/1994 | Cadien et al. ................ | 51/308 |
| 5,478,435 A | 12/1995 | Murphy et al. .......... | 156/636.1 |
| 5,662,769 A | 9/1997 | Schonauer et al. ......... | 438/633 |
| 5,735,963 A | 4/1998 | Obeng .......................... | 134/3 |
| 5,783,489 A | 7/1998 | Kaufman et al. ........... | 438/692 |
| 5,840,629 A | 11/1998 | Carpio ....................... | 438/692 |
| 5,863,838 A | 1/1999 | Farkas et al. ............... | 438/693 |
| 5,954,997 A | 9/1999 | Kaufman et al. .......... | 252/79.1 |
| 6,008,405 A | 12/1999 | Gray et al. .................... | 562/3 |
| 6,046,110 A | 4/2000 | Hirabayashi et al. ....... | 438/693 |
| 6,063,306 A | 5/2000 | Kaufman et al. .......... | 252/79.4 |
| 6,074,949 A | 6/2000 | Schonauer et al. ......... | 438/692 |
| 6,077,337 A | 6/2000 | Lee .............................. | 106/3 |
| 6,083,838 A | 7/2000 | Burton et al. ............... | 438/691 |
| 6,083,840 A | 7/2000 | Mravic, deceased et al. .......................... | 438/693 |

(List continued on next page.)

FOREIGN PATENT DOCUMENTS

| | | | |
|---|---|---|---|
| EP | 0 401 147 A2 | 5/1990 | ......... H01L/21/302 |
| EP | 0 620 293 A1 | 10/1994 | ............. C23F/1/18 |
| EP | 0 846 742 A2 | 6/1998 | ............ C09G/1/02 |
| EP | 0 859 407 A1 | 8/1998 | ......... H01L/21/768 |
| EP | 0 006 166 A1 | 6/2000 | .............. B41J/3/12 |
| FR | 2.722.511 | 1/1996 | ............. C23G/1/14 |
| WO | 93/10277 | 5/1993 | ........... C23C/18/38 |
| WO | 98/49723 | 11/1998 | ......... H01L/21/321 |
| WO | 99/46353 | 9/1999 | ........... C09K/13/00 |
| WO | 99/53532 | 10/1999 | ........... H01L/21/00 |
| WO | 00/53691 | 9/2000 | ............ C09K/3/14 |
| WO | 00/59029 | 10/2000 | ............ H01I/21/60 |
| WO | 02/20682 | 3/2002 | ............ C09G/1/02 |

OTHER PUBLICATIONS

USSN 09/359,141, filed Jul. 21, 1999.
USSN 09/163,582, filed Sep. 30, 1998.
PCT International Search Report for US/01/43267 dated Aug. 7, 2002 (AMAT/5580.PC).
PCT International Search Report for US/02/00062 dated Jul. 8, 2002 (AMAT/5538.PC).

Primary Examiner—Timothy V. Eley
(74) Attorney, Agent, or Firm—Moser, Patterson & Sheridan

(57) ABSTRACT

A method and composition for planarizing a substrate. The composition includes a pressure sensitive solution and one or more chemical agents for complexing with a metal or oxidized metal. The method for removal of a copper containing layer from a substrate surface, comprising applying a composition to a polishing media, the composition comprising a pressure sensitive solution, and one or more chemical agents for complexing with a metal or oxidized metal, and polishing the substrate surface with the polishing media.

20 Claims, 3 Drawing Sheets

U.S. PATENT DOCUMENTS

| | | | |
|---|---|---|---|
| 6,096,652 A | 8/2000 | Watts et al. | 438/692 |
| 6,099,604 A | 8/2000 | Sandhu et al. | 51/307 |
| 6,117,775 A | 9/2000 | Kondo et al. | 438/690 |
| 6,117,779 A | 9/2000 | Shelton et al. | 438/692 |
| 6,117,783 A | 9/2000 | Small et al. | 438/693 |
| 6,123,088 A | 9/2000 | Ho | 134/1.3 |
| 6,126,853 A | 10/2000 | Kaufman et al. | 252/79.1 |
| 6,136,218 A | 10/2000 | Skrovan et al. | 252/79.1 |
| 6,136,714 A | 10/2000 | Schutz | 438/692 |
| 6,156,661 A | 12/2000 | Small | 438/692 |
| 6,217,416 B1 | 4/2001 | Kaufman et al. | 451/41 |
| 6,238,592 B1 | 5/2001 | Hardy et al. | 252/79.1 |
| 6,276,996 B1 * | 8/2001 | Chopra | 451/41 |
| 6,447,371 B2 * | 9/2002 | Brusic Kaufman et al. | 451/36 |
| 6,475,069 B1 * | 11/2002 | Thomas et al. | 451/57 |
| 2001/0011507 A1 * | 8/2001 | Korem | 101/217 |
| 2002/0019202 A1 * | 2/2002 | Thomas et al. | 451/57 |
| 2002/0168923 A1 * | 11/2002 | Kaufman et al. | 451/36 |
| 2003/0032371 A1 * | 2/2003 | Weinstein et al. | 451/41 |

* cited by examiner

ADDITIVES FOR PRESSURE SENSITIVE POLISHING COMPOSITIONS

BACKGROUND OF THE INVENTION

1. Field of the Invention

The invention relates generally to the fabrication of semiconductor devices and to polishing and planarizing of substrates.

2. Background of the Related Art

Reliably producing sub-half micron and smaller features is one of the key technologies for the next generation of very large scale integration (VLSI) and ultra large scale integration (ULSI) of semiconductor devices. However, as the fringes of circuit technology are pressed, the shrinking dimensions of interconnects in VLSI and ULSI technology has placed additional demands on the processing capabilities. The multilevel interconnects that lie at the heart of this technology require precise processing of high aspect ratio features, such as vias, contacts, lines, and other interconnects. Reliable formation of these interconnects is important to VLSI and ULSI success and to the continued effort to increase circuit density and quality of individual substrates and die.

In the fabrication of integrated circuits and other electronic devices, multiple layers of conducting, semiconducting, and dielectric materials are deposited on from a surface of a substrate and portions of the layers may be removed. Thin layers of conducting, semiconducting, and dielectric materials may be deposited by a variety of deposition techniques. Common deposition techniques in modern processing include physical vapor deposition (PVD), also known as sputtering, chemical vapor deposition (CVD), plasma-enhanced chemical vapor deposition (PECVD), and now electro-chemical plating (ECP).

As layers of materials are sequentially deposited and removed, the uppermost surface of the substrate may become non-planar and require planarization prior to subsequent processing. Planarizing a surface, or "polishing" a surface, is a process where material is removed from the surface of the substrate to form a generally even, planar surface. Planarization is useful in forming features on a substrate by removing excess deposited material used to fill the features and to provide an even surface for subsequent levels of metallization and processing. Planarization is also useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates. CMP utilizes a chemical composition, typically a slurry or other fluid medium, for selective or non-selective removal of material from a substrate surface. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. The CMP apparatus effects polishing or rubbing movement between the surface of the substrate and the polishing pad while dispersing a polishing composition, or slurry, to effect chemical activity and/or mechanical activity and consequential removal of material from the surface of the substrate.

Conventional CMP processes are performed using an abrasive article, such as a polishing composition, or slurry, containing abrasive particles in a reactive solution with a conventional polishing pad. Alternatively, the abrasive article can be a fixed abrasive article, such as a fixed abrasive polishing pad, which may be used with a CMP composition or slurry that does not contain abrasive particles. A fixed abrasive article typically comprises a backing sheet with a plurality of geometric abrasive composite elements adhered thereto. Additionally, polishing compositions without abrasives, or abrasive-free compositions, may be used with polishing media free of abrasive articles to polish a substrate surface.

Conventionally, in polishing substrates having features, such as a dual damascenes features formed by the deposition of a barrier layer in an aperture and a conductive material, for example copper, disposed on the barrier layer formed thereon, the conductive material is polished to the barrier layer, and then the barrier layer is polished to the underlying dielectric layer to form the feature. One challenge that is presented in polishing conductive materials is that the interface between the conductive material and the barrier layer is generally non-planar. Further, the conductive material and the barrier materials are often removed from the substrate surface at different rates, both of which can result in excess conductive material being retained as residues on the substrate surface.

Additionally, substrate surfaces may have different surface topography, depending on the density or size of features formed therein, which makes effective conformal removal of excess conductive material from the substrate surface difficult to achieve. For example, it has been observed that excess conductive material from one area of the substrate surface having a dense feature area is removed at a slower removal rate, and with residual copper material remaining after polishing, as compared to removing copper material from a substrate surface area having few, if any, features formed therein, and minimal or reduced excess conductive material residues.

To ensure removal of all the excess conductive material and residues before removing the barrier material, it is necessary to overpolish the copper and the interface. Overpolishing of copper and the interface can result in forming topographical defects, such as concavities or depressions, referred to as dishing, and can further lead to non-uniform removal of the barrier layer disposed thereunder. Additionally, overpolishing can result in erosion, the excessive removal of dielectric material surrounding a feature.

One proposed solution to reduce dishing and erosion is the use of pressure sensitive slurries, also known as non-Prestonian slurries. Prestonian slurries are broadly defined as slurries that have a removal rate proportional to both the contact pressure between the substrate and platen and the polishing speed of the platen. Non-Prestonian slurries have removal rates that are not proportional to the polishing pressure and the polishing speed. For example, a non-Prestonian slurry may have a linear correlation between removal rate and polishing pressure, but may reach a range of polishing pressures, typically at decreasing polishing pressures, which results is no noticeable removal of material from the substrate surface.

FIG. 1 shows a comparison between Prestonian slurry A, typically a conventional polishing slurry, and non-Prestonian slurry B. The Prestonian slurry A is shown with a polishing rate having a constant linear slope or removal rate versus polishing pressure (or polishing speed), while the non-Prestonian slurry B has a polishing rate with a variable linear slope, indicted by a period of no noticeable removal rate followed by a sudden increase in removal rate versus polishing pressure during the application of increasing polishing pressure.

It has been observed that the pressure sensitive slurries are insensitive to overpolishing and exhibit reduced or minimal dishing or erosion of substrate features. However, pressure sensitive slurries have difficulty removing residual amounts of copper containing material from a substrate surface even under extreme amounts of overpolishing.

Therefore, there exists a need for a polishing method and related polishing composition that facilitates the removal of residual amounts of copper containing material from a substrate surface.

SUMMARY OF THE INVENTION

The invention generally provides a method and composition for planarizing a substrate surface with reduced or minimal residue remaining from polishing processes. In one aspect, a composition is provided for planarizing a substrate including a pressure sensitive solution and one or more chemical agents for complexing with a metal or oxidized metal, wherein the complexing agent is selected from the group of ammonium salts of organic acids, amines, amine derivatives, compounds with one or more peroxy acid groups, ions of at least one transition metal, and combinations.

In another aspect, a method is provided for planarizing a substrate surface, comprising applying a composition to a polishing media, the composition including a pressure sensitive solution and one or more chemical agents for complexing with a metal or oxidized metal, wherein the complexing agent is selected from the group of ammonium salts of organic acids, amines, amine derivatives, compounds with one or more peroxy acid groups, ions of at least one transition metal, and combinations, and polishing the substrate surface.

In another aspect, a method is provided for removal of a copper containing layer from a substrate surface including applying a composition to a polishing media, the composition including a pressure sensitive solution, between about 1 wt. % or less of a solution containing ammonium salts of organic acids, about 10 wt. % or less abrasive particles, and polishing the substrate surface with the polishing media. The solution containing ammonium salts of organic acids may include up to about 40 wt. % citric acid, up to about 5 wt. % ammonium hydroxide, deionized water, and a pH between about 3 and about 7.

BRIEF DESCRIPTION OF THE DRAWINGS

So that the manner in which the above recited aspects of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In general, aspects of the invention provide compositions and methods for planarizing a substrate surface with reduced or minimal residue remaining from polishing processes. The invention will be described below in reference to a planarizing process for the removal of residues of excess conductive materials, such as copper containing materials, from a substrate surface by chemical mechanical planarization, or chemical mechanical polishing (CMP) technique. Chemical-mechanical polishing is broadly defined herein as polishing a substrate by chemical activity, mechanical activity, or a combination of both chemical and mechanical activity.

Residual conductive material is broadly defined as any excess conductive material remaining after one or more polishing process steps. Residual conductive materials, may include copper containing materials, such as copper, copper alloys, and/or doped copper as well as by-products, such as copper oxides, of copper containing materials removed from the substrate surface. Residual conductive material may partially or completely cover the surface a substrate, for example, a portion of the underlying barrier layer may be exposed when residual material is retained after a polishing step, or alternatively, no barrier layer may be exposed after a polishing process has been performed.

The planarizing process and composition that can used to polish a substrate disposed in chemical mechanical polishing process equipment, such as the Mirra® CMP System available from Applied Materials, Inc., as shown and described in U.S. Pat. No. 5,738,574, entitled, "Continuous Processing System for Chemical Mechanical Polishing," the entirety of which is incorporated herein by reference to the extent not inconsistent with the invention.

Although, the CMP process and composition described herein is illustrated utilizing the Mirra® CMP System, any system enabling chemical mechanical polishing using the composition described herein can be used to advantage. Examples of other suitable apparatus include orbital polishing systems, such as the Obsidian 8200C System available from Applied Materials, Inc., or a linear polishing system, using a sliding or circulating polishing belt or similar device. An example of a linear polishing system is more fully described in co-pending U.S. patent application Ser. No. 09/244,456, filed on Feb. 4, 1999, and incorporated herein by reference to the extent not inconsistent with the invention. The following apparatus description is illustrative and should not be construed or interpreted as limiting the scope of the invention.

Figure 1:
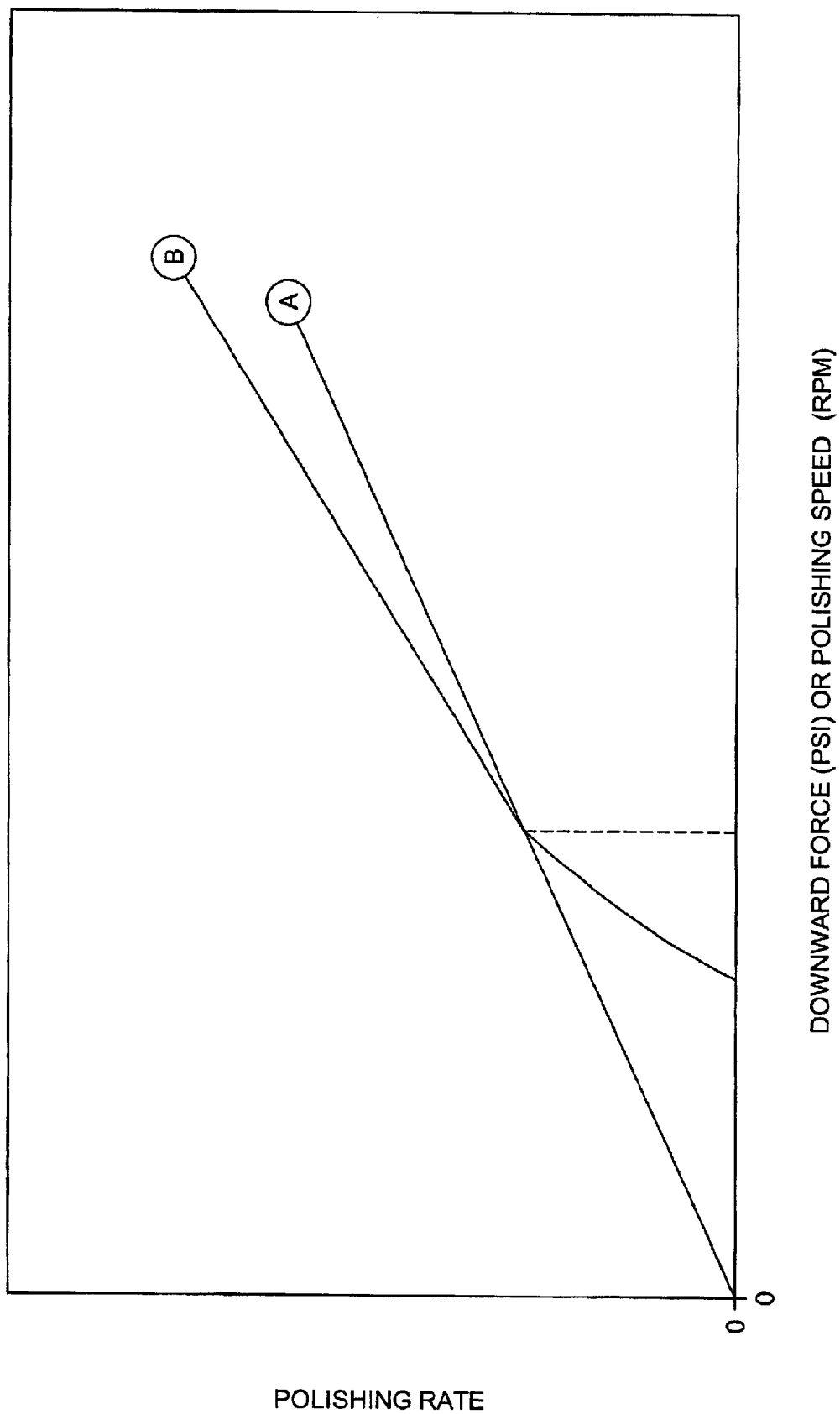
FIG. 1 is graph showing the polishing rate versus downward force or Rpm's of a Prestonian slurry and non-Prestonian slurry.
Figure 2:
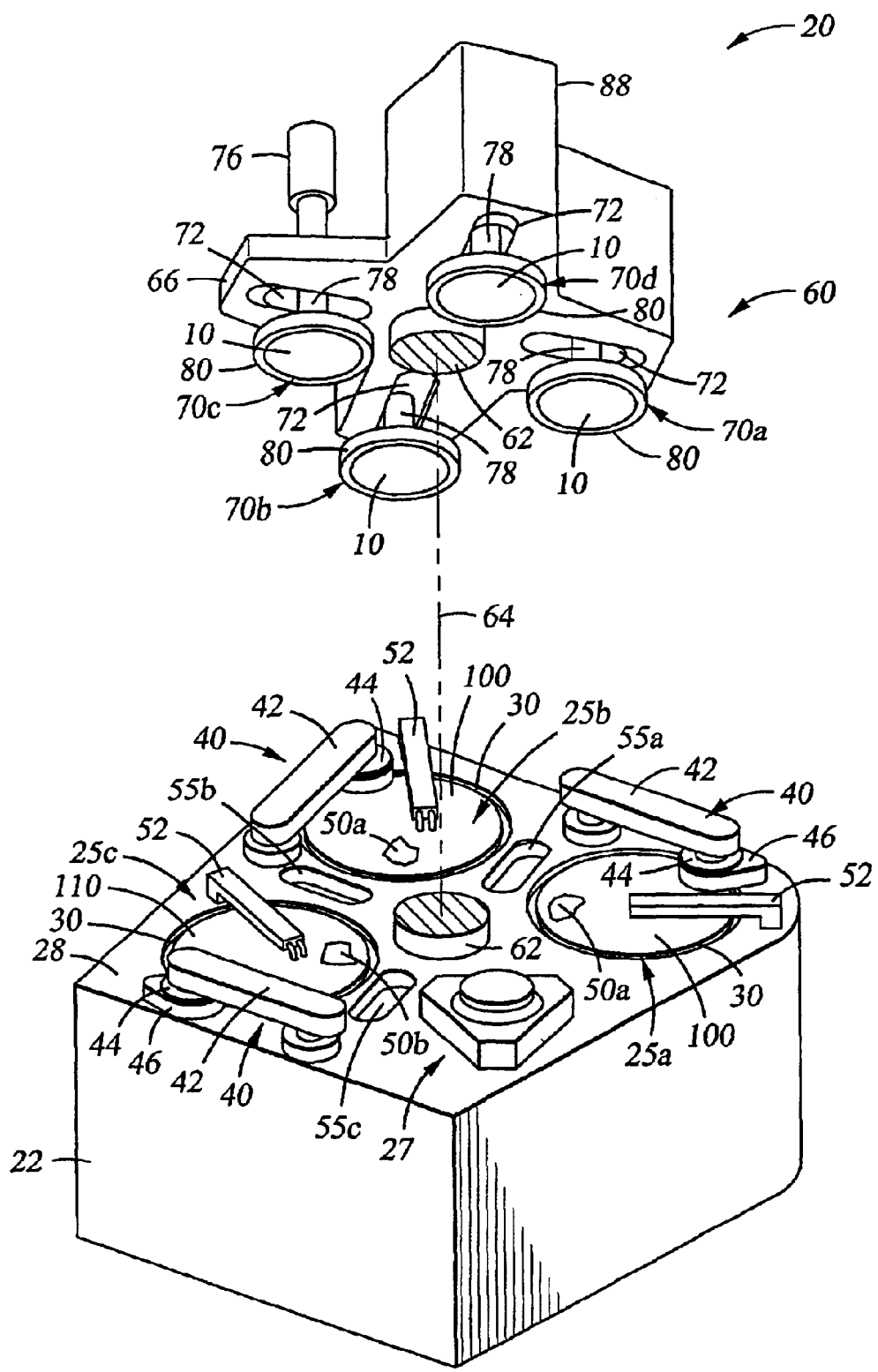
FIG. 2 is a schematic perspective view of a chemical mechanical polishing apparatus.

FIG. 2 is a schematic perspective view of a chemical mechanical polishing apparatus 20. The polishing apparatus 20 includes a lower machine base 22 with a table top 28 mounted thereon and a removable outer cover (not shown). The table top 28 supports a series of polishing stations, including a first polishing station 25a, a second polishing station 25b, a final polishing station 25c, and a transfer station 27. The transfer station 27 serves multiple functions, including, for example, receiving individual substrates 10 from a loading apparatus (not shown), washing the substrates, loading the substrates into carrier heads 80, receiving the substrates 10 from the carrier heads 80, washing the substrates 10 again, and transferring the substrates 10 back to the loading apparatus.

Each polishing station 25a–25c includes a rotatable platen 30 having a conventional polishing media 100 or fixed-abrasive polishing media 110 disposed thereon. Each platen 30 may be a rotatable aluminum or stainless steel plate connected to a platen drive motor (not shown). Conventional polishing media or "abrasive-free" polishing media is polishing media that is free of abrasive articles or embedded abrasive particles, and which may have a smooth polishing surface or a roughened polishing surface. An example of a conventional polishing media is the IC-1000 polishing pad available from Rodel Inc., of Phoenix, Ariz. (IC-1000 is product names of Rodel, Inc.). Fixed-abrasive polishing media is polishing media including abrasive particles disposed in a binder material. The binder material may be formed to produced a plurality of shaped elements extending above a backing material of the polishing media. Fixed-abrasive pads are available from 3M Corporation of Minneapolis, Minn. and Rodel Inc., of Phoenix, Ariz.

The polishing stations 25a–25c may include a media conditioner apparatus 40. The media conditioner apparatus 40 has a rotatable arm 42 holding an independently rotating conditioner head 44 and an associated washing basin 46. The media conditioner apparatus 40 maintains the condition of the polishing media so that it will effectively polish the substrates. Each polishing station may include a conditioning station if the CMP apparatus is used with other media configurations.

The polishing stations 25a–25c may each have a slurry/rinse arm 52 that includes two or more supply tubes to provide one or more chemical slurries and/or water to the surface of the polishing media. The slurry/rinse arm 52 delivers the one or more chemical slurries in amounts sufficient to cover and wet the entire polishing media. Each slurry/rinse arm 52 also includes several spray nozzles (not shown) that can provide a high-pressure fluid rinse on to the polishing media at the end of each polishing and conditioning cycle. Furthermore, two or more intermediate washing stations 55a, 55b, and 55c may be positioned between adjacent polishing stations 25a, 25b, and 25c to clean the substrate as it passes from one station to the next.

A rotatable multi-head carousel 60 is positioned above the lower machine base 22. The carousel 60 includes four carrier head systems 70a, 70b, 70c, and 70d. Three of the carrier head systems receive or hold the substrates 10 by pressing them against the polishing medias 100 or 110 disposed on the polishing stations 25a–25c. One of the carrier head systems 70a–70d receives a substrate from and delivers a substrate 10 to the transfer station 27. The carousel 60 is supported by a center post 62 and is rotated about a carousel axis 64 by a motor assembly (not shown) located within the machine base 22. The center post 62 also supports a carousel support plate 66 and a cover 68.

The four carrier head systems 70a–70d are mounted on the carousel support plate 66 at equal angular intervals about the carousel axis 64. The center post 62 allows the carousel motor to rotate the carousel support plate 66 and orbit the carrier head systems 70a–70d about the carousel axis 64.

Each carrier head system 70a–70d includes one carrier head 80. A carrier drive shaft 78 connects a carrier head rotation motor 76 (shown by the removal of one quarter of the cover 68) to the carrier head 80 so that the carrier head 80 can independently rotate about its own axis. There is one carrier drive shaft 74 and motor 76 for each head 80. In addition, each carrier head 80 independently oscillates laterally in a radial slot 72 formed in the carousel support plate 66.

The carrier head 80 performs several mechanical functions. Generally, the carrier head 80 holds the substrate 10 against the polishing media 100 or 110, evenly distributes a downward pressure across the back surface of the substrate 10, transfers torque from the drive shaft 78 to the substrate 10, and ensures that the substrate 10 does not slip out from beneath the carrier head 80 during polishing operations.

A computer-based controller may be connected to the polishing system or apparatus for instructing the system to perform one or more processing steps on the system, such as polishing a substrate or transferring a substrate in the polishing apparatus. To facilitate control of the system, the controller may include a CPU, which CPU may be one of any form of computer processors that can be used in an industrial setting for controlling various chambers and sub-processors. The memory is coupled to the CPU. The memory, or computer-readable medium, may be one or more of readily available memory such as random access memory (RAM), read only memory (ROM), floppy disk, hard disk, or any other form of digital storage, local or remote. For storing information and instructions to be executed by the CPU.

The support circuits are coupled to the CPU for supporting the processor in a conventional manner. These circuits include cache, power supplies, clock circuits, input/output circuitry and subsystems, and can include input devices used with the controller 190, such as keyboards, trackballs, a mouse, and display devices, such as computer monitors, printers, and plotters. Such controllers are commonly known as personal computers; however, the present invention is not limited to personal computers and can be implemented on workstations, minicomputers, mainframes, and supercomputers.

A process, for example a polishing process described below, is generally stored in the memory, typically as a software routine. The software routine may also be stored and/or executed by a second CPU that is remotely located from the hardware being controlled by the CPU.

In one embodiment, the process described herein may be implemented as a computer program-product for use with a computer system or computer based controller. The programs defining the functions of the preferred embodiment can be provided to a computer via a variety of signal-bearing media and/or computer readable media, which include but are not limited to, (i) information permanently stored on non-writable storage media (for example, read-only memory devices within a computer such as read only CD-ROM disks readable by a CD-ROM or DVD drive; (ii) alterable information stored on a writable storage media (for example, floppy disks within diskette drive or hard-disk drive); or (iii) information conveyed to a computer by communications medium, such as through a computer or telephone network, including wireless communication. Such signal-bearing media, when carrying computer-readable instructions that direct the functions of the invention, represent alternative embodiments of the present invention. It may also be noted that portions of the product program may be developed and implemented independently, but when combined together are embodiments of the present invention.

Chemical Mechanical Polishing Process and Composition

A polishing method and composition is provided to planarize a substrate surface with reduced or minimal residual conductive materials remaining from a polishing process using a pressure sensitive slurry. Residual conductive material is broadly defined as any excess conductive material remaining after one or more polishing process steps. Residual conductive materials may include copper containing materials removed from the substrate surface, such as copper, copper alloys, and/or doped copper as well as by-products, such as copper oxides, of copper containing materials.

Residual conductive material may partially or completely cover the surface of a substrate, for example, a portion of the underlying barrier layer may be exposed when residual material is retained after a polishing step, or alternatively, no barrier layer may be exposed after a polishing process has been performed.

Conductive materials are broadly defined herein as metal or metal derivatives, such as metal oxides, used to form conductive features in semiconductor manufacturing. As used throughout this disclosure, copper containing material or copper is intended to encompass high purity elemental copper as well as copper-based alloys, for example, copper-based alloys containing at least about 80 wt. % copper as well as by-products, such as copper oxides, of copper containing materials.

In one aspect of the invention, one or more chemical agents for complexing with a metal or oxidized metal are added to a pressure sensitive solution to produce a pressure sensitive polishing composition.

A pressure sensitive composition is broadly defined herein as any composition that has a variable or non-linear relationship between removal rate of materials disposed on a substrate and polishing pressure and/or polishing speed. Examples of commercially available pressure sensitive solutions include the C430 series of polishing compositions, such as HC-430-A3, available from Hitachi Chemical Corp. of Japan, and the EPL series of polishing compositions, including EPL 2352, EPL 2613, EPL 2315, and EPL 2313, available from Eternal Chemical Company Ltd. Of Taiwan, and the CUS series of compositions, including CUS3125, CUS-3126, CUS-3127, and CUS-3128, available from Rodel Inc., of Phoenix, Ariz. For example, the HC-430-A3 exhibits non-linear polishing rates to polishing pressures below about 1.5 psi and the EPL 2352 exhibits non-linear polishing rates to polishing pressures below about 1.0 psi. The above examples are illustrative of pressure sensitive compositions and should not be construed or interpreted as limiting the scope of the invention.

The one or more chemical agents for complexing with a metal or oxidized metal may include ammonium salts of organic acids, amines, amine derivatives, compounds with one or more complexing moieties, ions of one or more transitional ions, or combinations thereof. The one or more chemical agents may comprise between about 10 ppm and about 10 wt. % of the composition.

Organic acids for use in forming ammonium salts of organic acids include carboxylic acids having one or more acid groups. Examples of organic acids include acetic acid, propionoic acid, benzoic acid, succinic acid, and combinations thereof, among others.

The amines, or amine derivatives, include compounds having one or more amine or amide groups. Examples of amines and amine derivatives include di-ethyl amine, di-methyl amine, ethylenediamine, methylformamide, and combinations thereof. Amine derivatives also include amino containing acids, for example, glycine and ethylenediaminetetraacetic acid.

The compounds having one or more complexing moieties can include a reagent, which can comprise a peracid, a peroxyacid, or combinations thereof. The reagent may further include those compounds that function not only as an oxidizer but also complexes with the oxidized metal to enhancing removal of metal residues by solubilizing the oxidized metal. Embodiments of the invention, therefore, comprise an organic reagent that contains an oxidizing moiety having a hydrophilic head with a peroxide group and a second moiety which is hydrophobic tail having an alkyl or aryl group.

Various reagents can be employed or formulated to implement the oxidizing and complexing functions for use in the processes described herein. For example, the oxidizing moiety can comprise a peroxide group, for example, a peroxycarboxylic acid group or a peroxycarboxylate group, in which case the resulting complexing agent comprises a carboxylic acid or carboxylate. The complexing moiety can comprise an alkyl group or derivative thereof, such as a polyethylene glycol, or an aryl group, such as benzene or a derivative thereof. Thus, suitable reagents include peroxy acids such as peroxybenzoic acid, chlorobenzoic acid, peroxyacetic acid and peroxyformic acid. Suitable peracids include peracetic acid and perbenzoic acids. Other organic peroxides such as benzoyl peroxide can also be used as an oxidizing and complexing reagent. In addition, suitable reagents include polyethylene glycol peroxy acids, such as $HOOOC-(CH_2CH_2O)_n-COOOH$, wherein n is about 15, and can be synthesized from polyethylene glycol.

The reagent can also include a compound that dissociates into an oxidizer and a complexing agent. This ability can increase the shelf life of the reagent. Suitable reagents for dissociating into an oxidizer and a complexing agent in accordance with the embodiments of the invention include any of various amine-peroxy acids, such as urea hydrogen peroxide.

The one or more chemical agents may include ions of one or more metal ions derived from metal salts. Metal salts include, for example, copper salt selected from the group of copper sulfate, copper fluoborate, copper gluconate, copper sulfamate, copper sulfonate, copper pyrophosphate, copper chloride, copper cyanide, and combinations thereof. In one aspect of the composition, copper (II) ions, ($Cu^{2+}$), have been used to remove metal residues from substrate surfaces during polishing. The above examples of chemical agents are illustrative and should not be construed or interpreted as limiting the scope of the invention.

In one aspect of the composition, the one or more chemical agents include a complexing solution. The complexing solution includes one or more chelating agents, deionized water, and one or more pH-adjusting agents to produce a pH between about 3 and about 11. In one aspect, the complexing solution comprises about 0.5 vol % of the composition. Example of a complexing solution which may be used in the composition described herein include commercially available substrate cleaning solutions, such as Electra Clean™ from Applied Materials, Inc., of Santa Clara, Calif.

The one or more chelating agents of the complexing solution may include an acid, a base, or a combination thereof. The acid may include an organic acid, such as a carboxylic acid having one or more acid groups. Examples of acids suitable for use in the complexing solution include acetic acid, citric acid, maleic acid, and combinations thereof. The acid can be present in an amount up to about 40 wt. % of the complexing solution.

In one aspect of the complexing solution, the acid comprises between about 5 wt. % and about 30 wt. % of the complexing solution. The acid may also perform as a chelating agent in the complexing solution, for example, acetic acid may perform as a chelating agent for copper or copper alloys. The complexing solution may be diluted to between about 10 vol % and about 25 vol % of the initial concentration of the complexing solution. When a diluted solution is used, the acid preferably has a concentration between about 2 wt. % and about 10 wt. % of the diluted complexing solution.

The base may include ammonium hydroxide, ammonium hydroxide derivatives, amines, and combinations thereof. Examples of amines include primary amines, such as methylamine and ethylamine, secondary amines, and combinations thereof. The base may include compounds having one or more amine groups or amide groups, such as ethylenediaminetetraacetic acid, methylformamide, or ethylenediamine. An example of an ammonium hydroxide derivative is tetramethyl ammonia hydroxide. The base can be present in an amount up to about 5 wt. % of the complexing solution. In one aspect, the base includes between about 0.5 wt. % and about 3.0 wt. % of the complexing solution. The base may also perform as a chelating agent in the complexing solution, for example, ammonium hydroxide may perform as a chelating agent for copper or copper alloys. Generally, acids and bases that may perform as chelating agents chemically react with material, such as metal ions, from the surface of the substrate or in the complexing solution to form a soluble metal complex for removal from the surface of the substrate.

The one or more pH-adjusting agents may include non-oxidizing organic and inorganic acids or bases. The pH-adjusting agent is generally in an amount sufficient to generate or maintain a desired pH between about 3 and about 11, such as an acidic pH, for example a pH of about 3, or a neutral pH. A neutral pH includes a pH between about 6 and about 8. In one aspect, the complexing solution has a pH between about 3 and about 7. Examples of pH-adjusting agents include bases such as potassium hydroxide (KOH), and/or inorganic and/or organic acids, such as acetic acid, phosphoric acid, or oxalic acid.

An acidic pH-adjusting agent may be used with a basic chelating agent; a basic pH-adjusting agent may be used with an acidic chelating agent; and both acidic and basic pH-adjusting agents may be used with a combination of acidic and basic chelating agents. The one or more pH-adjusting agents may include acidic chelating agents, basic chelating agents, or a combination thereof in the complexing solution.

Corrosion inhibitors, such as any various organic compounds containing an azole group, including benzotriazole (BTA), mercaptobenzotriazole, or 5-methyl-1-benzotriazole (TTA), can be added to the complexing solution in a amount between about 0.01 wt. % and about 0.50 wt. % of the complexing solution. In one aspect, the corrosion inhibitor comprises about 0.05 wt. % of the complexing solution.

The complexing solution, for example, may comprise up to about 40 wt. % of an acid, for example, between about 5 and about 30 wt. % citric acid, up to about 5 wt. % of ammonium hydroxide, ammonium hydroxide derivatives, amines, and combinations thereof, for example, between about 0.5 and about 3.0 wt. % ammonium hydroxide, the remainder deionized water.

Additionally, pH-adjusting agent or agents can be present in the composition in an amount sufficient to adjust the pH of the CMP composition to a range between about 2 and about 11. The one or more pH-adjusting agents may include non-oxidizing organic and inorganic acids or bases. The pH-adjusting agent is generally in an amount sufficient to generate or maintain a desired pH between about 3 and about 11, such as an acidic pH, for example a pH of about 3, or a neutral pH, e.g., a pH between about 6 and about 8. In one aspect, the composition has a pH between about 3 and about 7. Examples of pH-adjusting agents include bases such as potassium hydroxide (KOH), and/or inorganic and/or organic acids, such as acetic acid, phosphoric acid, or oxalic acid.

Additionally, a reducing agent may be added to the complexing solution to enhance removal of material from the substrate surface. The reducing agent can be selected from the group of hydroxylamine, glucose, sulfothionate, potassium iodide, and combinations thereof. The reducing agent can be present in an amount between about 0.01 wt. % to about 20 wt. % of the complexing solution. In one aspect, the reducing agent comprises between about 0.01 wt. % to about 5 wt. % of the complexing solution. In one aspect of the invention, a concentration of about 0.1 wt. % of reducing agent is used in the complexing solution.

Alternatively, embodiments of the invention may include adding abrasive particles to polishing compositions one or more chemical agents described herein for planarizing a substrate surface. Compositions containing abrasive particles may comprise an abrasive particle concentration of about 10 wt. % or less of the composition. Alternatively, a concentration between about 1 wt. % or less of abrasive particles is included in CMP compositions containing the one or more chemical agents described herein. Abrasive components may include, but are not limited to, alumina ($Al_2O_3$), silica ($SiO_2$), titania ($TiO_2$), or ceria ($CeO_2$) particles, or any other abrasives known in the art and used in conventional CMP compositions.

The CMP compositions and processes described herein can additionally polish and planarize metal layers, including layers comprised of copper, copper alloys, doped copper, aluminum, doped aluminum, nickel, doped nickel, tantalum, tantalum nitride, tungsten, tungsten nitride, titanium, titanium nitride, and combinations thereof. It is further contemplated that other materials, including titanium-tungsten (TiW), titanium silicon nitride (TiSiN), tantalum silicon nitride (TaSiN), tungsten silicon nitride (WSiN), and silicon nitride used for forming barrier layers with conductive materials, such as copper, may be polished and planarized using the compositions described herein.

The above polishing compositions may be used to polish substrates under operating conditions including polishing pressures between about 1 psi and about 6 psi, and/or polishing speeds between about 20 rpms and about 130 rpms for a polishing duration between about 30 seconds and about 2,000 seconds to planarize a substrate surface.

While the exact mechanism of the polishing composition and process is not known with certainty, it is believed that the additives to the slurry impart a residual material removal rate that reduces or minimizes the retention of residual copper containing materials on the substrate surface.

EXAMPLES

An example of a pressure sensitive composition according to the invention includes a solution of HC-430-A3, commercially available from Hitachi Chemical Co., of Japan. The HC-430-A3 solution was used to polish a substrate surface having copper disposed thereon. The substrate was polished at a polishing rate between about 20 rpms and about 130 rpms for between about 30 seconds and 300 seconds with a polishing pressure between about 3 psi and 4 psi. Examination of the polished substrate under an optical microscope indicated the presence of metal residues. Between about 0.5 vol % and about 1.0 vol % of a solution of ammonium salts of organic acids comprising 26 wt. % citric acid, 4 wt. % ammonium hydroxide, at a pH of about 4, was added to the HC-430-A3 solution and the substrate was polished under identical processing conditions. Examination of the polished substrate under an optical microscope indicated no presence of metal residues. The pressure sensitive composition also contains about 5 wt. % or less of abrasive particles.

Another comparison for metal residue removal for a pressure sensitive polishing composition with and without additives described herein was performed with an abrasive containing pressure sensitive composition. The abrasive containing polishing composition of EPL 2352, commercially available from Eternal Chemical Co. Inc., of Taiwan, was used to polish a substrate surface having copper disposed thereon at a polishing rate between about 20 rpms and about 130 rpms for between about 30 seconds and 300 seconds with a polishing pressure between about 3 psi and 4 psi. EPL 2352 contains about 5 wt. % or less of abrasive particles. Examination of the polished substrate under an optical microscope indicated the presence of metal residues. Between about 100 ppm and about 1 wt. % of copper sulfate was added to the EPL 2352 solution and the substrate was polished under identical processing conditions. Examination of the polished substrate under an optical microscope indicated no presence of metal residues.

A third example of the comparison for metal residue removal for a pressure sensitive polishing composition with and without additives described herein was performed using a polishing slurry of CUS-3125, commercially available from Rodel, Inc., of Phoenix, Ariz., and an organic acid, such as oxalic acid. CUS-3125 was used to polish a substrate surface having copper disposed thereon at a polishing rate between about 20 rpms and about 130 rpms for between about 30 seconds and 300 seconds with a polishing pressure between about 3 psi and 4 psi. Examination of the polished substrate under an optical microscope indicated the presence of metal residues. Between about 100 ppm and about 1 wt. % of peroxyacetic acid was added to the CUS-3125 solution and the substrate was polished under identical processing conditions. Examination of the polished substrate under an optical microscope indicated no presence of metal residues.

Figure 3:
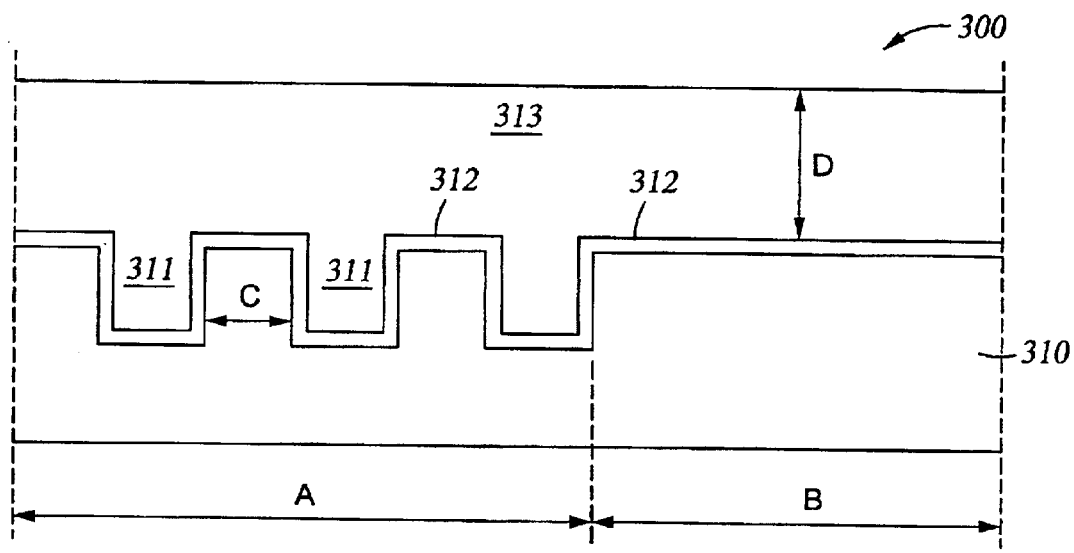
FIGS. 3–5 are schematic diagrams illustrating one embodiment of a process for forming a feature on a substrate.
Figure 4:
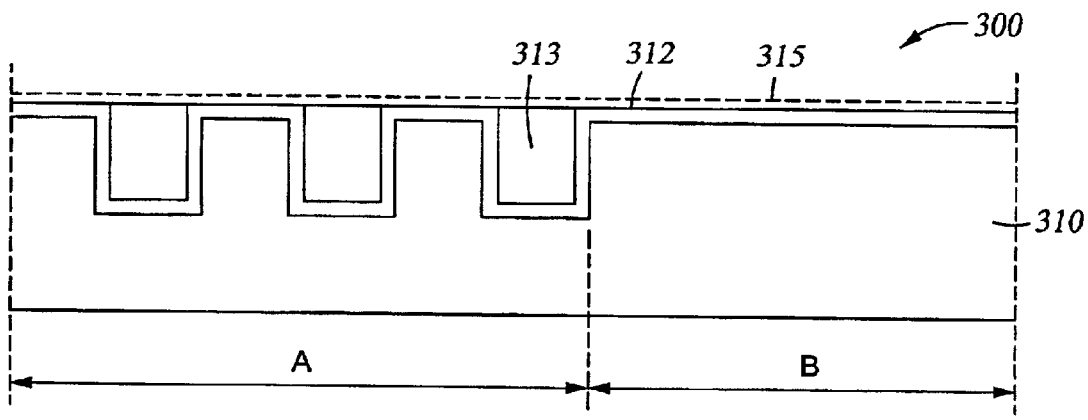
Figure 5:
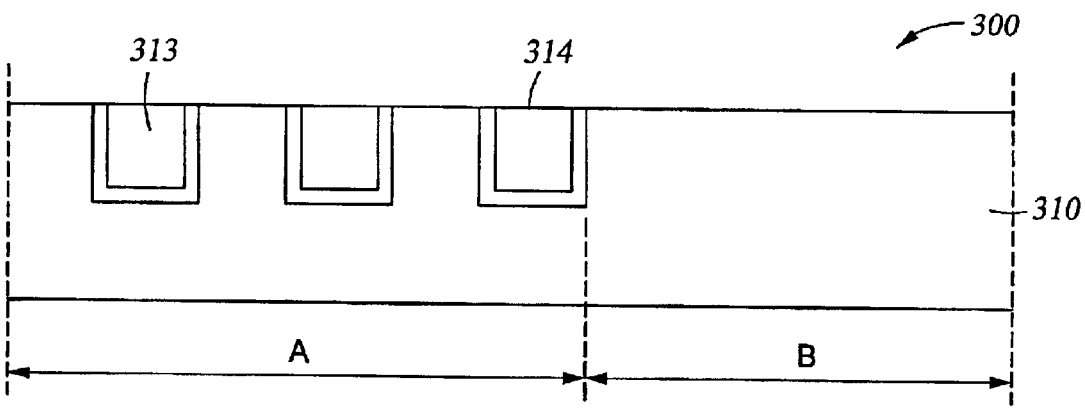

FIGS. 3–5 are schematic diagrams illustrating one embodiment of a process for forming a feature on a substrate utilizing the composition described above in the apparatus described above and shown in following FIG. 2.

FIG. 3 is a schematic cross-sectional view of an example of one type of feature formed on a substrate that requires planarization. The substrate includes a dielectric layer 310, such as a silicon oxide or a carbon-doped silicon oxide, is formed on a substrate 300. A plurality of apertures 311, such as vias, trenches, or holes, are patterned and etched into the dielectric layer 310 in area A forming features for a dense array of conductive lines with area B being unetched. Typically, the openings 311 are spaced apart by a distance C which can be less than about 1 micron, such as about 0.2 micron, or greater than 10 microns, such as 20 microns. The openings 311 may be formed in the dielectric layer 310 by conventional photolithographic and etching techniques. A barrier layer 312 of a conductive material, such as tantalum (Ta) or tantalum nitride (TaN) for a copper metallization, is disposed conformally in the openings 311 and on the upper surface of the dielectric layer 310. A conductive material layer 313, such as copper, is disposed on the barrier layer at a thickness (D), which may be a thickness between about 8,000 Å and about 18,000 Å.

The dielectric layer 310 may comprise any of various dielectric materials conventionally employed in the manufacture of semiconductor devices. Organic-inorganic dielectric materials may be used, and include silicon dioxide derived from organic precursors, such as tetraethyl orthosilicate (TEOS) or trimethylsilane, by thermal or plasma enhanced chemical vapor deposition (PECVD). The invention also contemplates the use of other dielectric materials, such as silicon dioxide, phosphorus-doped silicon glass (PSG), boron-phosphorus-doped silicon glass (BPSG), and low dielectric constant materials, including fluoro-silicon glass (FSG), polymers, such as polyamides, and carbon-containing silicon dioxide.

One type of barrier layer 312 comprises tantalum, tantalum nitride, or combinations thereof. As used throughout this disclosure, the word "tantalum" and the symbol "Ta" are intended to encompass tantalum, tantalum nitride, and combinations thereof. The invention also contemplates the use of tantalum alloys and tantalum containing compounds, such as tantalum silicon nitride, which may be used as barrier materials. The invention also contemplates the use of other barrier materials for copper conventionally known in the art.

One type of conductive material layer 313 comprises copper containing materials. Copper containing materials include copper, copper alloys (for example copper-based alloys containing at least about 80 weight percent copper), or doped copper.

Referring to FIG. 4, the substrate is exposed to a CMP process employing the composition described herein to remove at least a portion of the copper layer 313 with reduced or minimal copper residue. Dashed line 315 represents where copper residue was retained on the substrate surface in conventional compositions in comparison to copper layer 313 removal by the compositions described herein.

Referring to FIG. 5, a second CMP process using a second CMP composition suitable for planarizing TaN and the underlying dielectric material can then be performed to remove the TaN barrier layer 312 and to remove or reduce scratching or defects formed in the dielectric layer on the substrate surface, thereby completing planarization. The resulting copper features comprises a dense array (A) of copper lines 313 bordered by open field B and the planar surface 314 of the copper metallization and substrate 300.

It has been observed that the resulting features formed in the dielectric materials with the CMP compositions described herein exhibit improved planarization at desired polishing rates for various applications. The improved planarization was observed to have reduced presence of topographical defects, such as dishing and erosion defects, compared to other pressure sensitive compositions with minimal material residues remaining on the surface after polishing. The CMP composition containing the one or more chemical agents described herein produce substrate with an improved polish quality and without detrimentally affecting the performance of the CMP composition.

The exact operative mechanism by which the inventive composition including ammonium salts of organic acids, amines, amine derivatives, compounds with one or more complexing moieties, ions of at least one transition metal, and combinations thereof facilitates removal of the residual copper containing material with minimal or no barrier layer removal, is not known with certainty. However, it is believed that the metal salts and chelating agents enhances the initiation of chemical reactions during CMP to enhance removal of copper containing material and allow removal of the residual copper containing material.

It is believed that the metal salts disassociate in the CMP composition to form metal ions that react with the chelating agents to form complexes. These complexes then react with the residual material on the substrate surface to enhance remove the residual material from the substrate. The invention contemplates the production of ions of at least one transition metal from sources other than metal salts.

The invention described herein is applicable to planarizing a substrate surface during various stages of semiconductor manufacturing by any of various CMP techniques using any of various CMP systems and polishing articles, such as fixed abrasive or abrasive slurry-type pads or sheets. The invention described herein enjoys particular applicability in the manufacture of high density semiconductor devices with metal features in the deep submicron range.

While the foregoing is directed to the one or more embodiments of the invention, other and further embodiments of the invention may be devised without departing from the basic scope thereof, and the scope thereof is determined by the claims that follow including their equivalents.

What is claimed is:

1. A method for planarizing a substrate surface, comprising:
    applying a composition to polishing media, the composition comprising:
        a pressure sensitive solution;
        one or more chemical agents comprising a complexing agent for complexing with a metal or oxidized metal, wherein the complexing agent is selected from the group of ammonium salts of organic acids, amines, amine derivatives, compounds with one or more peroxy acid groups, ions of at least one transition metal, and combinations thereof; and
        a corrosion inhibitor; and
    polishing the substrate surface.

2. The method of claim 1, wherein the composition further comprises deionized water and one or more pH-adjusting agents to produce a pH between about 2 and about 11.

3. The method of claim 1, wherein the one or more chemical agents comprise between about 10 ppm and about 10 wt. % of the composition.

4. The method of claim 1, wherein the one or more chemical agents comprise about 0.5 vol % of the composition.

5. The method of claim 1, further comprising abrasive particles.

6. The method of claim 5, wherein the abrasive particles comprise about 10 wt. % or less of the composition.

7. The method of claim 1, wherein the ions of at least one transition metal are derived from one or more metal salts.

8. The method of claim 7, wherein the one or more metal salts comprise a copper salt selected from the group of copper sulfate, copper fluoborate, copper gluconate, copper sulfamate, copper sulfonate, copper pyrophosphate, copper chloride, copper cyanide, and combinations thereof.

9. The method of claim 1, wherein polishing the substrate comprises contacting the substrate surface with the polishing media at a contact pressure between about 1 psi and about 6 psi.

10. The method of claim 1, wherein the complexing agent comprises a complexing solution comprising up to about 40 wt. % citric acid, up to about 5 wt. % ammonium hydroxide, deionized water, and a pH between about 3 and about 7.

11. A method for removal of a copper containing layer from a substrate surface, comprising:
    applying a composition to a polishing media, the composition comprising:
        a pressure sensitive solution;
        about 1 wt. % or less of a solution containing ammonium salts of organic acids;
        about 10 wt. % or less abrasive particles; and
        a corrosion inhibitor; and
    polishing the substrate surface with the polishing media.

12. The method of claim 11 wherein the solution containing ammonium salts of organic acids comprises up to about 40 wt. % citric acid, up to about 5 wt. % ammonium hydroxide, deionize1 water, and a pH between about 3 and about 7.

13. A composition for planarizing a substrate, comprising:
    a pressure sensitive solution;
    one or more chemical agents comprising a complexing agent for complexing with a metal or oxidized metal, wherein the complexing agent is selected from the group of ammonium salts of organic acids, amines, amine derivatives, compounds with one or more peroxy acid groups, ion of at least one transition metal, and combinations thereof; and
    a corrosion inhibitor.

14. The composition of claim 13, wherein the one or more chemical agents comprise between about 10 ppm and about 10 wt. % of the composition.

15. The composition of claim 13, wherein the one or more chemical agents comprise about 0.5 vol % of the composition.

16. The composition of claim 13, further comprising abrasive particles.

17. The composition of claim 16, wherein the abrasive particles comprise about 10 wt. % or less of the composition.

18. The composition of claim 13, wherein the ions of at least one transition metal are derived from one or more metal salts.

19. The composition of claim 18, wherein the one or more metal salts comprise a copper salt selected from the group of copper sulfate, copper fluoborate, copper gluconate, copper sulfamate, copper sulfonate, copper pyrophosphate, copper chloride, copper cyanide, and combinations thereof.

20. The composition of claim 1, wherein the complexing agent comprises a complexing solution comprising up to about 40 wt. % citric acid, up to about 5 wt. % ammonium hydroxide, deionized water, and a pH between about 3 and about 7.

* * * * *

UNITED STATES PATENT AND TRADEMARK OFFICE
CERTIFICATE OF CORRECTION

PATENT NO. : 6,783,432 B2 Page 1 of 1
DATED : August 31, 2004
INVENTOR(S) : Jui-Lung Li et al.

It is certified that error appears in the above-identified patent and that said Letters Patent is hereby corrected as shown below:

Column 1,
Line 29, please delete "from".

Column 2,
Line 61, please replace "is" with -- in --.

Signed and Sealed this

Twenty-eighth Day of June, 2005

JON W. DUDAS
*Director of the United States Patent and Trademark Office*